(12) United States Patent
Salisbury et al.

(10) Patent No.: US 9,344,648 B2
(45) Date of Patent: May 17, 2016

(54) HIGH DYNAMIC RANGE IMAGING

(71) Applicant: Thermoteknix Systems Limited, Cambridge (GB)

(72) Inventors: Richard Salisbury, Cambridge (GB); Kenneth Andrew Hagan, Cambridge (GB)

(73) Assignee: THERMOTEKNIX SYSTEMS LIMITED, Waterbeach, Cambridge (GB)

( * ) Notice: Subject to any disclaimer, the term of this patent is extended or adjusted under 35 U.S.C. 154(b) by 0 days.

(21) Appl. No.: 14/312,140

(22) Filed: Jun. 23, 2014

(65) Prior Publication Data

US 2015/0002714 A1    Jan. 1, 2015

(30) Foreign Application Priority Data

Jun. 26, 2013   (GB) .................................. 1311366.7

(51) Int. Cl.
| | |
|---|---|
| *H04N 9/73* | (2006.01) |
| *H04N 5/355* | (2011.01) |
| *H04N 5/232* | (2006.01) |
| *H04N 5/341* | (2011.01) |
| *H04N 5/235* | (2006.01) |
| *H04N 13/00* | (2006.01) |

(52) U.S. Cl.
CPC .......... *H04N 5/35536* (2013.01); *H04N 5/2355* (2013.01); *H04N 5/23232* (2013.01); *H04N 5/23238* (2013.01); *H04N 5/3415* (2013.01); *H04N 5/35572* (2013.01); *H04N 2013/0088* (2013.01)

(58) Field of Classification Search
CPC .......... H04N 5/23232; H04N 5/35536; H04N 5/35572; H04N 5/2355; H04N 2013/0088
USPC .................................... 348/222.1–229.1, 271
See application file for complete search history.

(56) References Cited

U.S. PATENT DOCUMENTS

2006/0177150 A1 *   8/2006   Uyttendaele et al. ......... 382/284

* cited by examiner

*Primary Examiner* — Yogesh Aggarwal
(74) *Attorney, Agent, or Firm* — Barlow, Josephs & Holmes, Ltd.

(57) ABSTRACT

A method for high dynamic range imaging using more than two capture intervals, where images are captured in a repeating sequence that avoids interlace bounce, and overlapping groups of combined images form composite frames for output, and an imaging system comprising an imaging array, processing means and a display, wherein the imaging array is operable to capture a succession of images by detecting incident light and the processing means is operable to process said images as required, and pass the processed images to the display for output.

37 Claims, 3 Drawing Sheets

HIGH DYNAMIC RANGE IMAGING

TECHNICAL FIELD OF THE INVENTION

The present invention relates to high dynamic range imaging, with particular relation to high dynamic range moving images. Most particularly, the present invention relates to an improved method for high dynamic range imaging and a system for implementing the same.

BACKGROUND OF THE INVENTION

In many instances, it is desirable to capture images where there are both very bright and very dark areas within the field of view. If a short capture interval is used, details within the bright areas can be imaged successfully but the darker areas remain unclear. If a longer capture interval is used, details within the darker areas can be imaged successfully but the brighter areas are saturated.

To overcome these issues, it is known to combine images captured using different capture intervals to produce a composite image having detail in both the light and dark areas. Commonly, two different capture intervals are used. In a particular method, two capture intervals are alternated frame by frame. Typically, the imaging array may operate in an interlaced manner such that the alternate images are captured using alternate rows of detector pixels within the array. In a similar manner, the resultant output can be interlaced. This provides a simple way of implementing this process. Additionally, for a steady scene, pixels in the output frames consistently map to detector elements operating at the same capture interval, providing a steady output image.

In the event that the dynamic range of any such images is insufficient, it is possible to use more than two capture intervals. This however causes a number of difficulties. Where three capture intervals are used, in a simple sequence, then interlacing is problematic. This is because the pixels in successive output frames at a given capture interval map on to alternate rows of detector elements. Hence for a steady scene, the output frames appear to 'bounce' by one line.

An additional difficulty with acquiring successive images at the different capture intervals and using these groups of successive images to generate a composite image is that this does reduce the effective frame rate. This is a particular problem with standard capture electronics as these operate at a fixed refresh rate (typically 50 Hz or 60 HZ). Accordingly, even where short capture intervals are used, each successive capture interval starts 20 ms (50 Hz systems) or 16.7 ms (60 Hz systems) after the previous capture interval. In many cases combining groups of successive images to generate a composite image can reduce the effective frame rate sufficiently that the human eye no longer perceives the output as smooth.

It is therefore an object of the present invention to provide a new method and system for high dynamic range imaging that at least partially overcomes or alleviates the above problems.

SUMMARY OF THE INVENTION

According to a first aspect of the present invention there is provided a method for high dynamic range imaging comprising the steps of: defining n capture intervals where n is 3 or above; and capturing a series of images at the said capture intervals in a repeating sequence of 2n−2 steps, wherein the first n steps of the sequence comprise one of each capture interval, and the n−2 capture intervals between the first and the $n^{th}$ capture intervals are then duplicated for the subsequent steps of the sequence and wherein each of the n−2 capture intervals between the first and the $n^{th}$ capture intervals that is in an odd position in the first n capture intervals of the sequence maintains an odd position when duplicated in the subsequent steps of the sequence and each of the n−2 capture intervals between the first and the $n^{th}$ capture intervals that is in an even position in the first n capture intervals within the sequence maintains an even position when duplicated in the subsequent steps of the sequence.

The present invention thereby provides a sequence for high dynamic range imaging using more than two different capture intervals. By duplicating n−2 of the capture intervals in the sequence in this manner, a sequence is provided whereby for a steady scene captured by an imaging array operating in an interlaced manner, only one set of detector rows operates on each occurrence of a particular capture interval. Whichever set of rows operates on a capture interval in the first n steps of the sequence, will also operate on all subsequent uses of that interval in the sequence. This eliminates interlace bounce in the resultant image.

Preferably, the n capture intervals are n different capture intervals.

In a preferred implementation, the scaling relationship between pixel values obtained from the different capture intervals may be determined by a predetermined analysis method. In particular, the determination may involve the steps of: capturing a series of images at different capture intervals; identifying groups of pixels that are within range for more than one capture interval; and applying a predetermined analysis method to said pixel values so as to identify a common scale factor and offset. As imaging performance can vary with operating temperature, overall scene brightness or other factors, dynamically determining a scaling relationship in this manner may provide a better image than continuing to use a preset scaling relationship.

The predetermined method may be a computational method.

Preferably, the predetermined method used to identify the scaling relationship is linear regression.

In an alternative embodiment, the predetermined method may be taking the mean of the ratios of corresponding pixel values obtained from different capture intervals.

In another alternative embodiment, the predetermined method may be a Robust Estimation method. An example of a suitable Robust Estimation method is set out in section 15.7 of 'Numerical Recipes in C: The Art of Scientific Computing' by William H. Press et al.

The capture intervals may be any suitable interval. Typically, the capture intervals may be of the order of 0.1-20 milliseconds. The range of capture intervals may be dependent on the desired image: where a dark biased composite image is required, the set of n capture intervals may include more than one relatively long capture interval and these long intervals may be duplicated in the sequence. Where a light biased image is required, the set of n capture intervals may include more than one relatively short capture intervals and these short intervals may be duplicated in the sequence. The skilled man will of course appreciate that different sets of capture intervals and/or different scaling relationships between capture intervals may be appropriate in different circumstances.

The method may comprise the additional step of combining n successive captured images to generate a series of composite frames for output. Preferably, each group of successive captured images comprises one image captured at each of the n capture intervals. Preferably, overlapping groups of n successive captured images are combined to generate composite frames.

One or more of the n successive captured images used to generate a composite frame may overlap with one or more of the n successive captured images used to generate the subsequent composite frame. Preferably, the overlap may comprise one captured image.

By overlapping the groups, the effective frame rate can be increased as compared with composite images comprising non-overlapping successive groups of captured images whilst still eliminating interlace bounce.

According to a second aspect of the present invention there is provided a method for high dynamic range imaging comprising the steps of: defining n capture intervals where n is 3 or above; capturing a series of images at the said capture intervals in a repeating sequence of 2n−2 steps; and combining groups of successive captured images to generate a succession of composite frames for output; wherein the groups of successive captured images used to generate composite frames overlap.

According to a third aspect of the present invention there is provided a method for high dynamic range imaging comprising the steps of: defining n capture intervals where n is 3 or above; capturing a series of images at said capture intervals in a repeating sequence of 2n−2 steps; and combining groups of successive captured images to generate a succession of composite frames for output; wherein the scaling relationship between pixel values obtained from the different capture intervals is determined by a predetermined analysis method.

The methods of the second and third aspects of the present invention may incorporate any or all features of the method of the first aspect of the present invention, as desired or as appropriate.

According to a fourth aspect of the present invention there is provided an imaging system comprising: an imaging array operable to capture images at n different capture intervals where n is 3 or above and operate in a repeating sequence of 2n−2 steps whereby the different capture intervals are each used for one of the first n steps of the sequence, and the n−2 intervals between the first and the $n^{th}$ intervals are then duplicated for the subsequent steps of the sequence and wherein each of the n−2 capture intervals between the first and the $n^{th}$ capture intervals that is in an odd position in the first n capture intervals of the sequence maintains an odd position when duplicated in the subsequent steps of the sequence and each of the n−2 capture intervals between the first and the $n^{th}$ capture intervals that is in an even position in the first n capture intervals within the sequence maintains an even position when duplicated in the subsequent steps of the sequence.

The system of the fourth aspect of the present invention may incorporate any or all features of the methods of the first, second or third aspects of the present invention as desired or appropriate.

The imaging array may be operable to capture incident radiation at any suitable frequency range. In particular, the array may be operable to capture infrared and/or visible light.

The imaging array may operate in an interleaved manner wherein alternate rows of detector elements are operable to capture successive images.

The imaging system may incorporate an image processing means. The image processing means may be operable to determine a scaling relationship between pixel values obtained from the different capture intervals. In particular, image processing means may be operable to: capture a series of images at different capture intervals; identify groups of pixels that are within range for more than one capture interval; and apply a predetermined analysis method to said pixel values so as to identify a common scale factor and offset. As imaging performance can vary with operating temperature, overall scene brightness or other factors, dynamically determining a scaling relationship in this manner may provide a better image than continuing to use a preset scaling relationship.

The image processing means may be operable to apply linear regression to said pixel values so as to identify a common scale factor and offset.

The image processing means may be operable to take the mean of the ratios of corresponding pixel values obtained from different capture intervals so as to identify a common scale factor and offset.

The image processing means may be operable to apply a method of Robust Estimation. A suitable Robust Estimation method is set out in section 15.7 of 'Numerical Recipes in C: The Art of Scientific Computing' by William H. Press et al to said pixel values so as to identify a common scale factor and offset.

The image processing means may be operable to determine the scale factor and offset for each group of subsequent frames used in a composite image.

The image processing means may be operable to determine the scale factor and offset continuously.

In a preferred implementation, the capture intervals are of the order of 0.1-20 milliseconds.

The image processing means may be operable to combine successive captured images to generate a series of composite frames for output. Preferably, the processing means is operable to act on overlapping groups of n successive captured images to generate composite frames, wherein each of the n successive captured images is captured at a different capture interval. One or more of the n successive captured images used to generate a composite frame may overlap with one or more of the n successive captured images used to generate the subsequent composite frame.

Preferably, the image processing means may be operable to overlap the groups of successive images combined to generate a composite frame by one captured image.

The imaging system may additionally incorporate display means operable to display the captured images or the composite frames. The display means may be operable to display the captured images or the composite frames in the same sequence as they were captured. The display means may operate in an interleaved manner wherein alternate rows of pixels are used for successive images or frames.

According to a fifth aspect of the present invention there is provided an imaging system comprising: an imaging array operable to capture images at n capture intervals in a repeating sequence of 2n−2 steps; a processing means operable to combine groups of n successive captured images to generate a succession of composite frames for output; wherein the groups of successive captured images used to generate composite frames overlap.

According to a sixth aspect of the present invention there is provided an imaging system comprising: an imaging array operable to capture images at n capture intervals in a repeating sequence of 2n−2 steps; a processing means operable to combine groups of n successive captured images to generate a succession of composite frames for output; wherein the scaling relationship between pixel values obtained from the different capture intervals is determined by a predetermined analysis method.

The systems of the fifth and sixth aspects of the present invention may incorporate any or all features described in respect of the first, second, third or fourth aspects of the present invention, as desired or as appropriate.

DESCRIPTION OF THE DRAWING FIGURES

In order that the invention may be more clearly understood embodiments thereof will now be described, by way of example only, with reference to the accompanying drawings, of which:

DETAILED DESCRIPTION OF A PREFERRED EMBODIMENT

Figure 1:
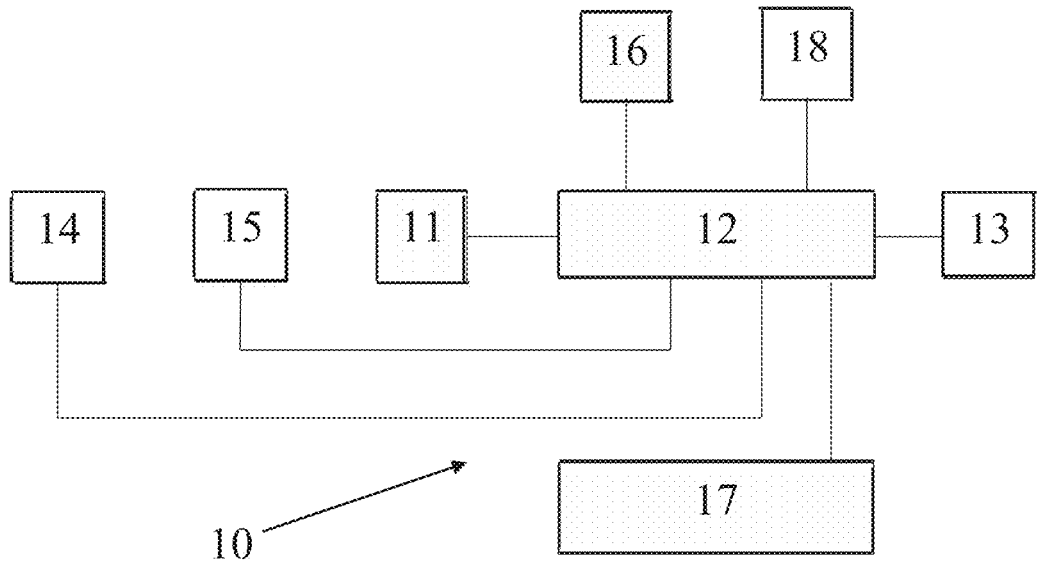
FIG. 1 is a schematic block diagram of an imaging system in accordance with the present invention.

The imaging system 10 of the present invention comprises an imaging array 11, processing means 12 and a display 13. The imaging array 11 is operable to capture a succession of images by detecting incident light. The processing means 12 is operable to process said images as required, and pass the processed images to the display 13 for output.

The imaging array 11 may be provided with a suitable lens arrangement 14 for focusing incident light and/or a shutter 15 for controlling the incidence of light. The lens arrangement 14 and shutter 15 may be controlled by the processing means 12.

The processing means may be further connected to user operable input controls 16, a storage unit 17 for storing captured images and communication means 18 for enabling data to be transmitted to or received from external devices via a suitable wired or wireless link.

For an example discussed in more detail in relation to FIGS. 3a and 3b below, the number of capture intervals, n, is 3: a long capture interval, a medium capture interval and a short capture interval. In operation, the imaging array 11 captures a series of images using the three different capture intervals. By combining these captured images, output images with a wide dynamic range can be produced. For the present example, the long capture interval is 8 ms, the medium capture interval is 1 ms and the short capture interval is 0.1 ms. The skilled man will of course appreciate that different capture intervals and/or different scaling between the capture intervals may be used where appropriate.

For an example discussed in more detail in relation to FIGS. 4a and 4b below, the number of capture intervals, n, is 5. In operation, the imaging array 11 captures a series of images using five different capture intervals. By combining these captured images, output images with a wide dynamic range can be produced. An example of five possible capture intervals would be 20 ms, 8 ms, 2 ms, 0.5 ms and 0.1 ms. The skilled man will of course appreciate that different capture intervals and/or different scaling between the capture intervals may be used in either of the above embodiments where appropriate.

The mutual scaling between pixel values from different capture intervals may be predetermined based on preset scaling determined at manufacture or during calibration. Alternatively, the processing means 12 may be operable to determine a scaling relationship between pixel values from the different capture intervals. Typically, a pixel value is obtained by sampling the output signal from the corresponding element in the array using an analogue to digital converter (ADC). As the ADC samples the complete electrical signal, not just the portion containing the image data, black pixels do not have a digitised value of 0. In practice, the range "black to white" is more like "100 to 1000". As such, where the same scene is imaged using two or more different capture intervals, the pixels in each image will have a linear relationship, defined by a scale factor. The scale factor will be roughly in line with the ratio of exposure times and the offset will be related to the ADC output level for black pixels.

Figure 2:
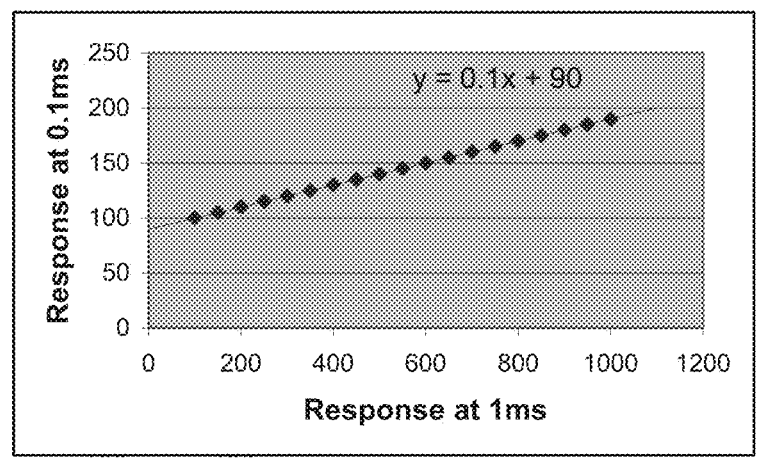
FIG. 2 illustrates the use of linear regression to determine an appropriate scaling between pixels.

In order to determine a scaling relationship for different capture intervals, the pixel values of corresponding pixel positions within images of the same scene at different capture intervals are compared. Pixel positions where the pixel values in one of the images are too bright (saturated), or too dark (black) are identified and eliminated from processing. The pixel values for a given position at different capture intervals can then be compared and subjected to a predetermined analysis method to determine the appropriate scale factor and offset. In this example, the analysis method is linear regression, and a visual example using pair of pixel values from two different capture intervals is shown in FIG. 2.

As the performance of a high-dynamic-range imaging system is sensitive to variations in operating temperature, overall scene brightness, or other uncontrolled factors, by dynamically and continuously tracking the scaling relationship an improved output image can be produced.

In the example embodiment where n=3, 2n−2=4, so the imaging array 11 operates in a repeating four step sequence. An example four step sequence is: long capture interval; medium capture interval; short capture interval; medium capture interval. As the medium capture interval is repeated within the sequence, additional detail can typically be imaged in the midpart of the imaging range. If a dark biased image or a light biased image is preferred, the skilled man will appreciate that the sequence may be adapted to repeat the long capture interval or short capture interval respectively.

Sequential operation of the type described above allows the array 11 to be operated in an interleaved manner wherein alternate rows of detector elements are operable to capture successive images and the display 13 to similarly operate in an interleaved manner wherein alternate rows of pixels are used for successive frames. If the interleaved captured images are passed directly to the display, for a steady scene, since there is a four step process, the same detector elements in the array 11 map to the same pixels in the display 13 for each capture interval. Accordingly interlace bounce is avoided. This example is further discussed below.

In the alternative example embodiment where n=5, 2n−2=8, so the imaging array 11 operates in a repeating eight step sequence. If the n capture intervals (20 ms, 8 ms, 2 ms, 0.5 ms and 0.1 ms in this example) are defined as A, b, C, d and E, with any capture interval corresponding to any letter, an example eight step sequence is: A, b, C, d, E, d, C, b. By assigning shorter or longer capture intervals to each of the letters, the sequence may be adapted to appropriately bias an image toward light or dark respectively.

Sequential operation of the type described above allows the array 11 to be operated in an interleaved manner wherein alternate rows of detector elements are operable to capture successive images and the display 13 to similarly operate in an interleaved manner wherein alternate rows of pixels are used for successive frames. If the interleaved captured images are passed directly to the display, for a steady scene, the same detector elements in the array 11 map to the same pixels in the display 13 for each capture interval. In this example, the lower case intervals in the sequence would map to the same detector elements in the array 11, and the upper case intervals would map to the other row of detector elements. As each capture interval is only operated at one of the two sets of detector rows, interlace bounce is avoided.

Given the same five capture intervals (A, b, C, d, E), a second eight step sequence is possible that also avoids interlace bounce: A, b, C, d, E, b, C, d. In this sequence, b and d occur in even positions in the first 5 steps of the sequence and, though they have been 'swapped', have maintained even positions in the subsequent steps of the sequence. In the example given, all instances of capture intervals b and d would still be operated on in the same detector row and as such interlace bounce is still avoided.

Any other permutation of the five capture intervals within the eight step sequence would either introduce interlace bounce by or create a sequence such that the composite frames of n subsequent captured images would not contain one image captured at each of the n intervals, this would reduce the dynamic range of the composite frame.

As a further possibility, the processing means 12 may be operable to combine successive groups of captured images to generate a composite frame for output by the display unit 13.

Returning to the example embodiment where n=3, this can be implemented using overlapping groups of three captured images such that the three successive captured images are images captured at each of the short, medium and long capture intervals. This has the benefit of providing an increased effective frame rate compared to the conventional method whereby non-overlapping groups of successive images are combined to create successive composite frames.

This overlapping is illustrated in more detail below and in FIGS. 3a and 3b, using the example long, medium and short intervals selected above. Given a repeating sequence of capture intervals in accordance with the present example: . . . 8 ms, 1 ms, 0.1 ms, 1 ms . . . composite frames may be generated by using groups of images that overlap by one image . . . (8 ms, 1 ms, 0.1 ms), (0.1 ms, 1 ms, 8 ms), (8 ms, 1 ms, 0.1 ms) . . . as set out in FIG. 3a. By overlapping the groups in this manner, the effective frame rate for the composite frames is around 25 frames per second.

In the prior art arrangement using a simple three step consecutive repeating sequence, successive composite frames would be generated by combining the outputs of non-overlapping groups of captured images . . . (8 ms, 1 ms, 0.1 ms), (8 ms, 1 ms, 0.1 ms), (8 ms, 1 ms, 0.1 ms), . . . as set out in FIG. 3b.

Combining the images in this manner would result in an effective composite frame rate of around 16.67 frames per second. This is not quite fast enough to be regarded as smooth by the human eye, unlike the rate of 25 frames per second achievable by the present invention.

In this sequence, the mid-range pixels are unique in each frame and on alternate frames the high or low pixel is repeated, providing increased temporal resolution at the mid part of the scale but reducing temporal resolution at the extremities of the range. The skilled man will however appreciate that different parts of the scale can be prioritised by choosing different repeated capture intervals as indicated above.

Figure 3A:
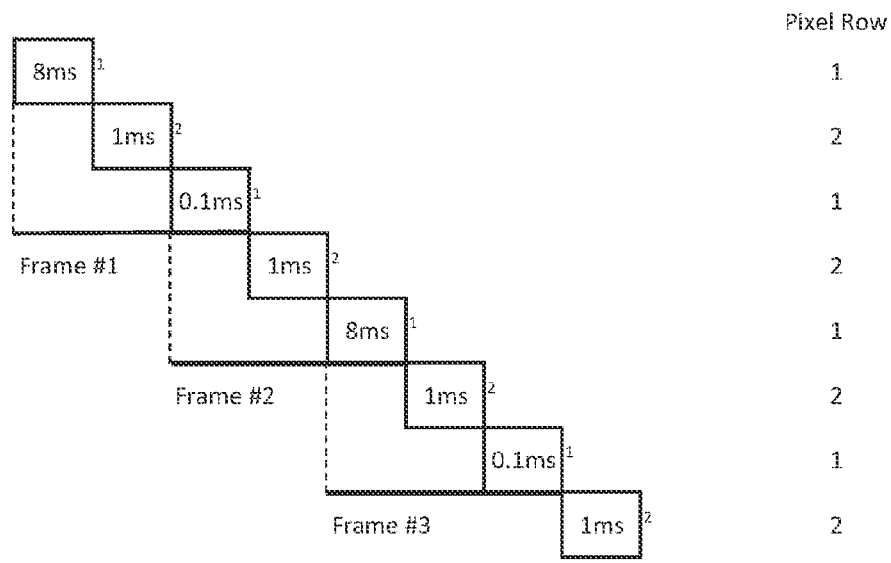
FIG. 3a illustrates the use of overlapping groups of images to generate composite frames where n=3.
Figure 3B:
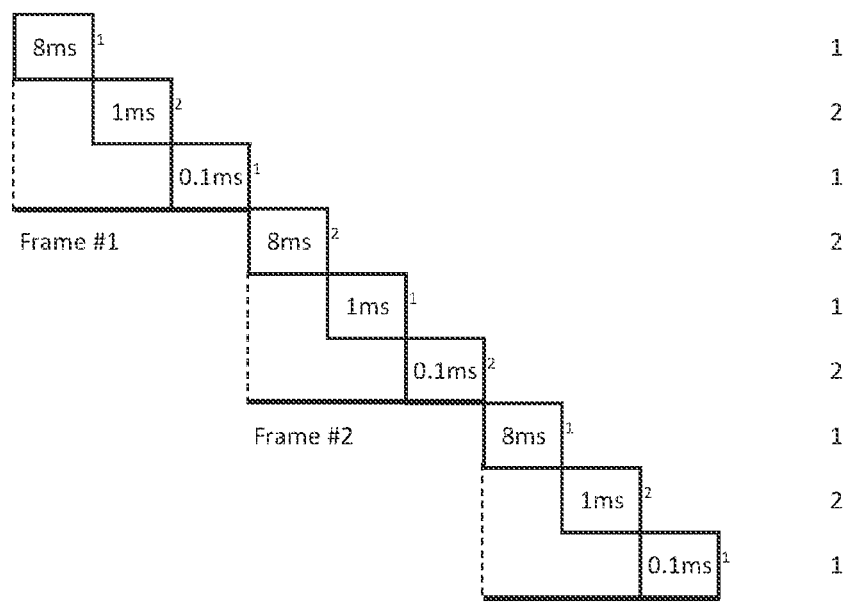
FIG. 3b illustrates the prior art method wherein successive non-overlapping groups of images are used to generate composite frames where n=3.

FIGS. 3a and 3b also illustrate the alternating sets of pixel rows 1, 2 that would be used for the different intervals in an interleaved operation when n=3. In the example of FIG. 3a, the repeated medium interval is always taken from row set 2. As such, there is no interlace bounce. In contrast, as can be seen in FIG. 3b, in the prior art sequence the medium interval is taken from alternating sets in successive frames thus causing bounce.

In the example embodiment outlined above where n=5, the processing means 12 may be operable to combine successive groups of five captured images to generate a composite frame for output by the display unit 13. In this example, the five successive images are each captured at a different capture interval and the groups of five successive images used for consecutive composite frames overlap by one captured image. Given a repeating sequence of capture intervals in accordance with the present example, . . . 20 ms (A), 8 ms (b), 2 ms (C), 0.5 ms (d), 0.1 ms (E), 0.5 ms (d), 2 ms (C), 8 ms (b) . . . composite frames may be generated by using groups of images that overlap by one image. In the present example, the first three composite frames would be: (20 ms, 8 ms, 2 ms, 0.5 ms, 0.1 ms), (0.1 ms, 0.5 ms, 2 ms, 8 ms, 20 ms), (20 ms, 8 ms, 2 ms, 0.5 ms, 0.1 ms). This is set out in FIG. 4a.

Overlapping groups of this kind would result in an effective composite frame rate of around 12.5 frames per second when using standard 50 Hz capture electronics. The prior art arrangement using a simple five step consecutive repeating sequence is set out in FIG. 4b. In this arrangement, successive composite frames would be generated by combining the outputs of non-overlapping groups of captured images . . . (A, b, C, d, E), (A, b, C, d, E), (A, b, C, d, E) . . . as shown. Using the example capture intervals of 20 ms, 8 ms, 2 ms, 0.5 ms, and 0.1 ms, the prior art technique would give an effective composite frame rate of around 10 frames per second using standard 50 Hz capture electronics. Accordingly, the technique of the present invention can once again be seen to provide an increased effective frame rate.

Figure 4A:
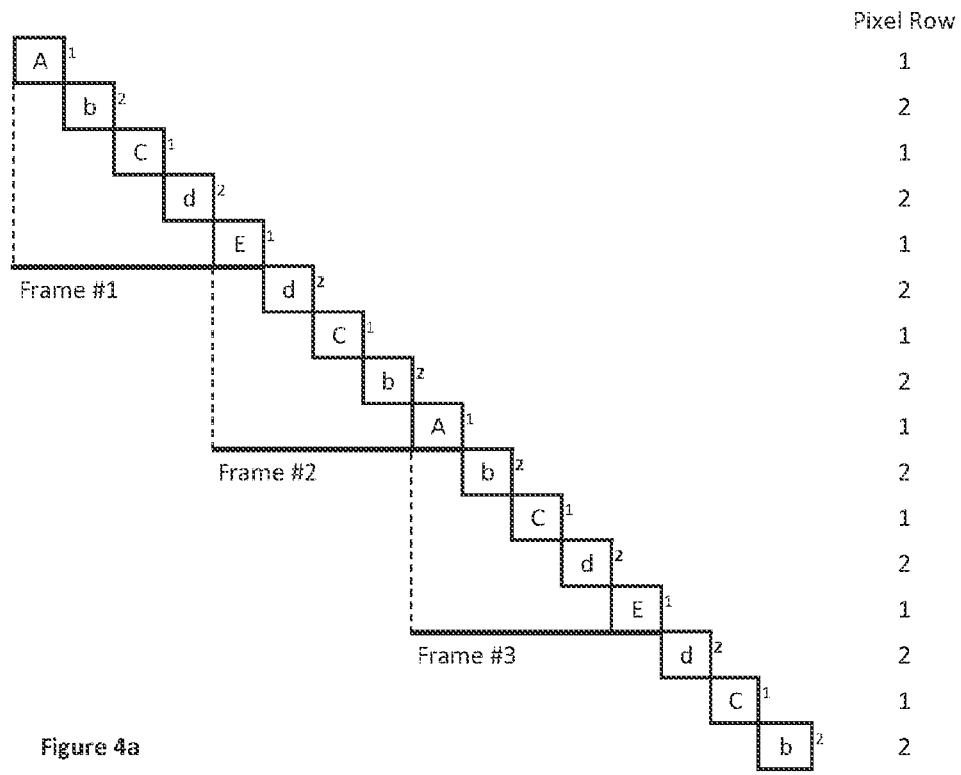
FIG. 4a illustrates the use of overlapping groups of images to generate composite frames where n=5.
Figure 4B:
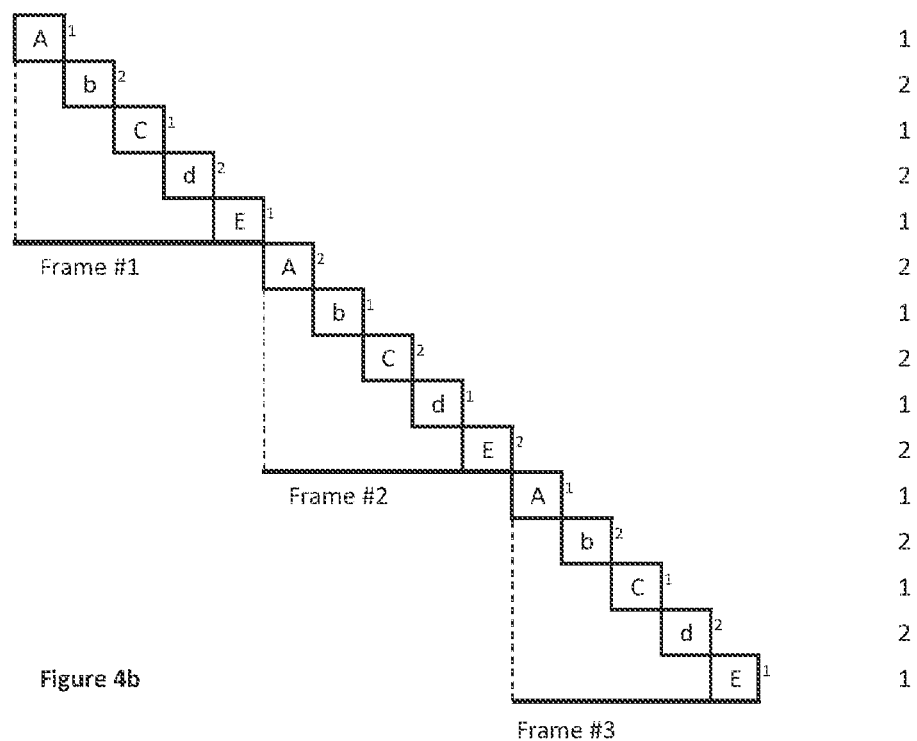
FIG. 4b illustrates the prior art method wherein successive non-overlapping groups of images are used to generate composite frames where n=5.

FIG. 4a illustrates the alternating sets of pixel rows 1, 2 that would be used for the different intervals in an interleaved operation when n=5. In the example shown in FIG. 4a, repeated intervals b, C, and d are always taken from row sets 2, 1 and 2 respectively, and intervals A and E are always taken from row set 1. Interlace bounce is therefore avoided. Contrastingly, in the prior art case shown in FIG. 4b, there are no repeated capture intervals, causing an interlace bounce. This can be seen, for example, by looking at capture interval A: the first instance of capture interval A is taken from row set 1, and the second instance of capture interval A is taken from row set 2, causing an interlace bounce.

The above embodiment is/embodiments are described by way of example only. Many variations are possible without departing from the scope of the invention as defined in the appended claims.

What is claimed is:

1. A method for high dynamic range imaging comprising the steps of:
defining n capture intervals where n is 3 or above; and
capturing a series of images at the said capture intervals in a repeating sequence of 2n−2 steps, wherein the first n steps of the sequence comprise one of each capture interval, and the n−2 capture intervals between the first and the $n^{th}$ capture intervals are then duplicated for the subsequent steps of the sequence and wherein each of the n−2 capture intervals between the first and the $n^{th}$ capture intervals that is in an odd position in the first n capture intervals of the sequence maintains an odd position when duplicated in the subsequent steps of the sequence and each of the n−2 capture intervals between the first and the $n^{th}$ capture intervals that is in an even position in the first n capture intervals within the sequence maintains an even position when duplicated in the subsequent steps of the sequence.

2. A method for high dynamic range imaging according to claim 1, wherein a scaling relationship between pixel values is determined by a predetermined analysis method from the different capture intervals.

3. A method for high dynamic range imaging according to claim 2, wherein the determination of the scaling relationship involves the steps of:
capturing a series of images at different capture intervals;
identifying groups of pixels that are within range for more than one capture interval; and
applying a predetermined analysis method to said pixel values so as to identify a common scale factor and offset.

4. A method for high dynamic range imaging according to claim 2, wherein predetermined method is any one of a computational method, linear regression, taking the mean of the ratios of corresponding pixel values obtained from different capture intervals, or a Robust Estimation method.

5. A method for high dynamic range imaging according to claim 1, wherein the capture intervals are of the order of 0.1-20 milliseconds.

6. A method for high dynamic range imaging according to claim 1, comprising the additional step of combining n successive captured images to generate a series of composite frames for output.

7. A method for high dynamic range imaging according to claim 6, wherein each group of successive captured images comprises one image captured at each of the n capture intervals.

8. A method for high dynamic range imaging according to claim 6, wherein one or more of the n successive captured images used to generate a composite frame overlap with one or more of the n successive captured images used to generate the subsequent composite frame.

9. A method for high dynamic range imaging according to claim 8, wherein the overlap comprises one captured image.

10. A method for high dynamic range imaging comprising the steps of:
defining n capture intervals where n is 3 or above;
capturing a series of images at the said capture intervals in a repeating sequence of 2n−2 steps; wherein the first n steps of the repeating sequence comprise one of each capture interval, and the n−2 capture intervals between the first and the $n^{th}$ capture intervals are then duplicated for the subsequent steps of the sequence; and
combining groups of successive captured images to generate a succession of composite frames for output; wherein the groups of successive captured images used to generate composite frames overlap.

11. A method for high dynamic range imaging according to claim 10, wherein each of the n−2 capture intervals between the first and the $n^{th}$ capture intervals that is in an odd position in the first n capture intervals of the sequence maintains an odd position when duplicated in the subsequent steps of the sequence and each of the n−2 capture intervals between the first and the $n^{th}$ capture intervals that is in an even position in the first n capture intervals within the sequence maintains an even position when duplicated in the subsequent steps of the sequence.

12. A method for high dynamic range imaging according to claim 10, wherein a scaling relationship between pixel values is determined by a predetermined analysis method from the different capture intervals.

13. A method for high dynamic range imaging according to claim 12, wherein the determination of the scaling relationship involves the steps of:
capturing a series of images at different capture intervals;
identifying groups of pixels that are within range for more than one capture interval; and
applying a predetermined analysis method to said pixel values so as to identify a common scale factor and offset.

14. A method for high dynamic range imaging according to claim 12, wherein predetermined method is any one of a computational method; linear regression;
taking the mean of the ratios of corresponding pixel values obtained from different capture intervals; or a Robust Estimation method.

15. A method for high dynamic range imaging according to claim 10, wherein the capture intervals are of the order of 0.1-20 milliseconds.

16. A method for high dynamic range imaging according to claim 10, wherein each group of successive captured images comprises one image captured at each of the n capture intervals.

17. A method for high dynamic range imaging according to claim 10, wherein the overlap comprises one captured image.

18. A method for high dynamic range imaging comprising the steps of:
defining n capture intervals where n is 3 or above;
capturing a series of images at said capture intervals in a repeating sequence of 2n−2 steps; wherein the first n steps of the repeating sequence comprise one of each capture interval, and the n−2 capture intervals between the first and the $n^{th}$ capture intervals are then duplicated for the subsequent steps of the sequence; and
combining groups of successive captured images to generate a succession of composite frames for output;
wherein the scaling relationship between pixel values obtained from the different capture intervals is determined by a predetermined analysis method.

19. A method for high dynamic range imaging according to claim 18, wherein each of the n−2 capture intervals between the first and the $n^{th}$ capture intervals that is in an odd position in the first n capture intervals of the sequence maintains an odd position when duplicated in the subsequent steps of the sequence and each of the n−2 capture intervals between the first and the $n^{th}$ capture intervals that is in an even position in the first n capture intervals within the sequence maintains an even position when duplicated in the subsequent steps of the sequence.

20. A method for high dynamic range imaging according to claim 18 wherein the determination of the scaling relationship involves the steps of:
capturing a series of images at different capture intervals;
identifying groups of pixels that are within range for more than one capture interval; and
applying a predetermined analysis method to said pixel values so as to identify a common scale factor and offset.

21. A method for high dynamic range imaging according to claim 18, wherein predetermined method is any one of a computational method; linear regression; taking the mean of the ratios of corresponding pixel values obtained from different capture intervals; or a Robust Estimation method.

22. A method for high dynamic range imaging according to claim 18, wherein the capture intervals are of the order of 0.1-20 milliseconds.

23. A method for high dynamic range imaging according to claim 18, wherein each group of successive captured images comprises one image captured at each of the n capture intervals.

24. A method for high dynamic range imaging according to claim 18, wherein one or more of the n successive captured images used to generate a composite frame overlap with one or more of the n successive captured images used to generate the subsequent composite frame.

25. A method for high dynamic range imaging according to claim 24, wherein the overlap comprises one captured image.

26. An imaging system comprising: an imaging array operable to capture images at n different capture intervals where n is 3 or above and operate in a repeating sequence of 2n−2 steps whereby the different capture intervals are each used for one of the first n steps of the sequence, and the n−2 intervals between the first and the $n^{th}$ intervals are then duplicated for the subsequent steps of the sequence and wherein each of the n−2 capture intervals between the first and the $n^{th}$ capture intervals that is in an odd position in the first n capture intervals of the sequence maintains an odd position when duplicated in the subsequent steps of the sequence and each of the n−2 capture intervals between the first and the $n^{th}$ capture intervals that is in an even position in the first n capture intervals within the sequence maintains an even position when duplicated in the subsequent steps of the sequence.

27. An imaging system according to claim 26, comprising an image processing means operable to combine n successive captured images to generate a series of composite frames for output.

28. An imaging system according to claim 27, wherein the image processing means is operable to overlap one or more of the n successive captured images used to generate a composite frame with one or more of the n successive captured images used to generate the subsequent composite frame.

29. An imaging system according to claim 28, wherein the overlap the image processing means is operable to create comprises one captured image.

30. An imaging system comprising: an imaging array operable to capture images at n different capture intervals where n is 3 or above and operate in a repeating sequence of 2n−2 steps whereby the different capture intervals are each used for one of the first n steps of the sequence, and the n−2 intervals between the first and the $n^{th}$-intervals are then duplicated for the subsequent steps of the sequence and an image processing means to combine groups of successive captured images to generate a succession of composite frames for output and operable on groups of successive captured images which overlap.

31. An imaging system according to claim 30, wherein the image processing means is operable to combine n successive captured images to generate a series of composite frames for output.

32. An imaging system according to claim 31, wherein the image processing means is operable to overlap one or more of the n successive captured images used to generate a composite frame with one or more of the n successive captured images used to generate the subsequent composite frame.

33. An imaging system according to claim 32, wherein the overlap the image processing means is operable to create comprises one captured image.

34. An imaging system comprising: an imaging array operable to capture images at n different capture intervals where n is 3 or above and operate in a repeating sequence of 2n−2 steps whereby the different capture intervals are each used for one of the first n steps of the sequence, and the n−2 intervals between the first and the $n^{th}$ intervals are then duplicated for the subsequent steps of the sequence and an image processing means to combine groups of successive captured images to generate a succession of composite frames for output and operable to determine the scaling relationship between pixel values obtained from the different capture intervals by a pre-determined analysis method.

35. An imaging system according to claim 34, wherein the image processing means is operable to combine n successive captured images to generate a series of composite frames for output.

36. An imaging system according to claim 35, wherein the image processing means is operable to overlap one or more of the n successive captured images used to generate a composite frame with one or more of the n successive captured images used to generate the subsequent composite frame.

37. An imaging system according to claim 36, wherein the overlap the image processing means is operable to create comprises one captured image.

* * * * *